C. BUGG.
AUTOMOBILE STEERING GUIDE.
APPLICATION FILED SEPT. 6, 1910.
1,023,810.
Patented Apr. 23, 1912.
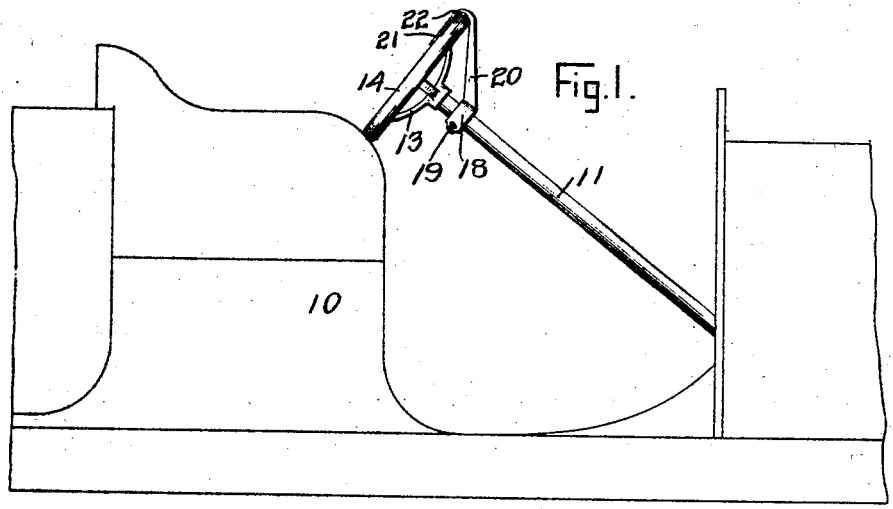
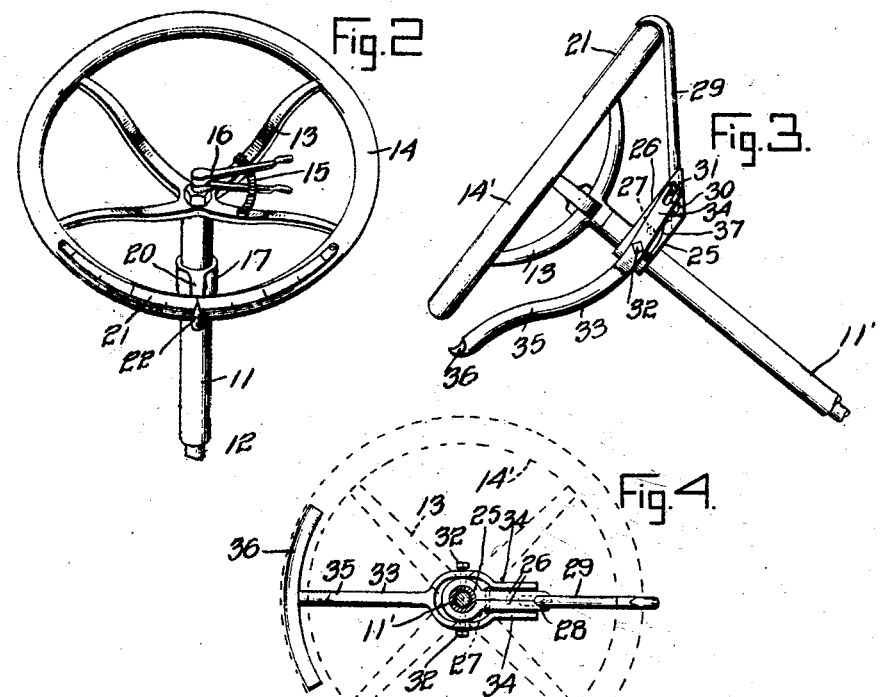
Witnesses
C. K. Reichenbach
W. H. Rockwell
Inventor
Claude Bugg
By H. L. Woodward
Attorney

UNITED STATES PATENT OFFICE.

CLAUDE BUGG, OF CLINTON, KENTUCKY.

AUTOMOBILE STEERING-GUIDE.

1,023,810.  Specification of Letters Patent.  Patented Apr. 23, 1912.

Application filed September 6, 1910. Serial No. 580,476.

*To all whom it may concern:*

Be it known that I, CLAUDE BUGG, a citizen of the United States, residing at Clinton, in the county of Hickman and State of Kentucky, have invented certain new and useful Improvements in Automobile Steering-Guides, of which the following is a specification.

This invention relates to automobile steering gear, and has for its object to provide a steering guide adapted for use with the usual hand control wheels in general use at this time.

A most important object is to provide a guide attachable to steering gears already in use without modifying their construction, and without changes or modifications in the construction of the steering posts of the usual type.

A further object of great importance in the art is to provide an indicating device which may be brought into releasable locking engagement with the hand wheel when set as desired, to hold the course set, against the tendency of the unevenness of the road surface to change it.

A further object is to provide such a device which will not interfere with the gripping of the wheel by the driver, in the ordinary manner, and which will not interfere with the manipulation of the usual spark and throttle levers of the various types.

Other objects and advantages will be apparent from the specification and from the drawings, in which—

Figure 1 is a side view of the device attached to the front side of the steering post; Fig. 2 is a rear view showing it at the rear side; Fig. 3 is a side view of the modification; Fig. 4 is a horizontal view of the last form.

There is shown in outline a portion of an automobile 10 having the usual tubular post 11 within which rotates the steering shaft 12, upon the upper end of which is secured a hand wheel comprising the spider 13 carrying the gripping rim 14. This wheel may be called the steering controller. As shown, the wheel carries the usual indicator segment 15 and throttle and gasolene levers working thereon, although it will be readily apparent that the device is equally applicable to machines having these levers beneath the wheel on the stationary post 11.

Secured to the post 11 a spaced distance below the spider 13 is the present device, comprising the clamping base 17 having spaced resilient arms 18, the spaces between which are properly arcuate or semi-circular and lined with non-abrasive material to allow them to be snugly engaged with posts of various diameters. The extremities of the arms 18 project past the post 11 and are apertured in registration, for the engagement therethrough of a suitable clamping bolt and nut 19 whereby the device may be securely clamped in position. The base member 17 is provided with an outwardly tapered arm 20 extending diagonally with respect to the axis of the engaged post 11. Its upper end portion is curved inward slightly, so as to project over the rim 14, its extremity being pointed.

The device is preferably adjusted with the arm 20 disposed at the forward side of the hand wheel, where it will not interfere with the hands of the driver, as in Fig. 1, but if found desirable, it may be adjusted at the inner side as shown in Fig. 2.

A segmental dial 21, of suitable size and having a suitable scale thereon is provided, to be secured upon the rim 14 in such relation to the arm 20 that the point 22 will indicate zero on the scale when the wheels of the car are set parallel with the longitudinal axis of the car, or to traverse an exactly straight course. As it usually requires less than half a turn of the hand wheel for the maximum movement of the wheels in either direction when turning and such maximum movement is but seldom required, a dial of approximately the size shown, in relation with the size of the hand wheel is sufficient for practical purposes.

In Figs. 3 and 4 there is shown an elaboration of the device by which the pointer is made to serve the double function of indicating the set of the wheels and locking the wheels releasably for a given course. In this form, which may be found preferable to the simpler one because of the added function, there is provided an anchor yoke 25, engaged detachably with the post 11' comprising substantially a split sleeve having its meeting portions continued as two parallel plates 26 receiving suitable clamping screws 27 therethrough adjacent their bases and having registering grooves 28 extending diagonally outward from the lower edges of the plates which are cut off in parallel with the grooves. The grooves form a circular passage in which there is slidably disposed the rod 29 having its pointed end curved inward over the adjacent portion of the rim 14' and being broadened adjacent the point and flattened on its inner side to snugly engage against the rim at times without damage thereto, as will be explained. The plates 26 are provided with diagonal slots 30 opening therethrough into the grooves, and the rod 29 is provided with trunnions 31 projected through the slots. Engaged through opposite sides of the sleeve and serving as an additional means for securing it upon the post 11' are screws 32 supporting pivotally an approximately U-shaped yoke 33, the opposite arms 34 of which are apertured adjacent their inner ends for the reception of the screws 32. The outer end portions of the arms 34 are inset close to the plates 26, being provided with longitudinal slots at their ends, receiving the trunnion 31 therein for slidable movement. A stem 35 springs from the bight of the yoke 33 and is provided at its extremity with a transversely extending segmental operating grip 36 disposed in proper spaced relation with the rim 14' to be grasped commonly therewith in the hand of a driver and forced upwardly toward the rim. It may be operated by a pressure of the thumb or engaged by the digits extended through the hand wheel.

It will be seen that a very serviceable and simply constructed attachment is provided, which may be readily attached to any of the usual types of motor vehicles now in use.

When traversing rough roads where the vibration is severe upon the hands and arms of the driver much of it may be relieved by the use of the locking device, which is instantly released by the removal of pressure from the grip. In order to entirely free the device from engagement with the rim 14' when released, a suitable spring may be provided as at 37 or otherwise.

An important feature of the device is that when traveling a rough road and it is desired to lock the wheel, no uncertainty exists as to the direction of the steering wheels when the lock is operated. As it is often utterly impossible for the strongest persons to control the wheel against rotation under the effect of the concussions of the wheels, it is of great service to have the pointer and gripping means operating in conjunction as here, to show when the wheel is engaged in the proper position.

In the majority of modern automobiles the steering wheels are entirely hidden from the sight of the driver, and it is frequently necessary, especially in the congested traffic of cities and towns, to limit the movement of the vehicle to a nicety, the variation of an inch or less from the desired course often entailing serious results. The use of the present device will assist greatly in such accurate steering.

When an auto vehicle is traveling a street paved with cobble stones and having a car track thereon, it is desirable to run on the track, in order to avoid the unpleasant vibration and damage to machinery and tires. But it is impossible, with the ordinary hand wheel and no guide, to keep the wheels properly set to remain upon the rails except by constant manipulation, and many persons have not the patience or dexterity to do it. It is usually easy to start a machine on the rails, and with the present invention, the wheels may be accurately set and locked to continue on the track when running on a straight course, and by the use of a proper scale on the dial 21 it should be possible to easily turn the front wheels to the proper angle to follow a curve; though there would be a tendency in the rear wheels to pass inwardly of the rails, this being often prevented in street car tracks by the broad and deep grooved rails used at such points.

What is claimed is:

1. In a controlling device, a revoluble controller wheel, an indicator member adjacent the periphery thereof fixed against rotation with the wheel, said wheel having an annular grip portion disposed adjacent the indicator and means on the grip portions adapted to coöperate with the indicator to indicate the action of the wheel, said indicator member being movable into engagement with the wheel, said grip portion having portions disposed and adapted to be engaged by the indicator, and means for moving the indicator into engagement with the wheel to hold it against rotation.

2. A device of the class described comprising a body member adapted for engagement with the steering post of a motor vehicle and carrying an indicating member thereon adapted to be disposed adjacent the hand wheel, said indicating member being movable into locking engagement with the wheel at times, and means for moving the indicating member into such engagement, said means including a member adapted to be disposed in close spaced relation with the hand wheel, movable toward and away from the wheel, and adapted to be grasped with the wheel for the purpose described.

3. A device of the class described comprising a body member adapted for detachable engagement with motor vehicle steering posts, a movable indicator member carried thereby for coöperation with the steering controller to indicate the position of the steering wheels, and adapted for locking engagement with the controller at times, and a lever carried by the body member and engaged with and adapted for operation to move the indicator into locking position.

In testimony whereof I affix my signature in presence of two witnesses.

CLAUDE BUGG.

Witnesses:
W. H. VAN HOOK,
THOS. EMERSON.